United States Patent
Murakami et al.

(10) Patent No.: US 7,509,883 B2
(45) Date of Patent: Mar. 31, 2009

(54) TORQUE DETECTING APPARATUS AND MANUFACTURING METHOD THEREOF

(75) Inventors: Tetsuya Murakami, Nara (JP); Takeshi Izumi, Kashiwara (JP); Yoshitomo Tokumoto, Nabari (JP); Takashi Kaoku, Yamatokooriyama (JP); Norio Nakatani, Nabari (JP); Toshiharu Ishihara, Kashiwara (JP); Naoki Nakane, Toyota (JP)

(73) Assignees: JTEKT Corporation, Osaka (JP); Denso Corporation, Aichi (JP)

( * ) Notice: Subject to any disclaimer, the term of this patent is extended or adjusted under 35 U.S.C. 154(b) by 0 days.

(21) Appl. No.: 11/100,463

(22) Filed: Apr. 7, 2005

(65) Prior Publication Data
US 2005/0223820 A1    Oct. 13, 2005

(30) Foreign Application Priority Data
Apr. 8, 2004   (JP)   ............... 2004-114349
Apr. 19, 2004  (JP)   ............... 2004-122863

(51) Int. Cl.
*G01L 3/00* (2006.01)

(52) U.S. Cl. ............... 73/862.331; 73/862.191; 73/862.321; 73/862.325; 73/862.332

(58) Field of Classification Search ............ 73/862.331, 73/862.332, 862.333, 862.334, 862.335
See application file for complete search history.

(56) References Cited

U.S. PATENT DOCUMENTS

| | | | |
|---|---|---|---|
| 4,724,710 A * | 2/1988 | Murty | 73/862.23 |
| 4,865,915 A * | 9/1989 | Okonogi et al. | 428/336 |
| 4,909,088 A * | 3/1990 | Tsals | 73/862.335 |
| 4,968,529 A * | 11/1990 | Hamamura et al. | 427/131 |
| 5,316,595 A * | 5/1994 | Hamada et al. | 148/302 |
| 6,059,718 A * | 5/2000 | Taniguchi et al. | 600/117 |
| 6,107,716 A | 8/2000 | Penketh | |
| 6,644,134 B2 * | 11/2003 | Laidlaw et al. | 73/862.331 |
| 6,707,185 B2 * | 3/2004 | Akutsu et al. | 310/71 |
| 6,868,744 B2 | 3/2005 | Sugimura et al. | |
| 6,928,887 B2 * | 8/2005 | Nakane et al. | 73/862.331 |
| 6,988,422 B2 * | 1/2006 | Sugimura et al. | 73/862.334 |
| 7,028,545 B2 * | 4/2006 | Gandel et al. | 73/328 |

(Continued)

FOREIGN PATENT DOCUMENTS

DE    203 05 732 U1    8/2003

(Continued)

OTHER PUBLICATIONS

Patent Abstrat of Japan for JP 11-248564 A published Sep. 17, 1999.*

*Primary Examiner*—Harshad Patel
*Assistant Examiner*—Punam Patel
(74) *Attorney, Agent, or Firm*—Birch, Stewart, Kolasch & Birch, LLP

(57) ABSTRACT

A detecting unit for detecting a torque applied to a rotor according to rotation of the rotor having an input shaft and an output shaft connected with each other by a torsion bar and a detection circuit board connected with the detecting unit are molded with synthetic resin material to form a mold member. The installation of the mold member into a housing, which has a cylinder portion to surround the rotor and a retainer having an opening formed at the peripheral wall of the cylinder portion, is achieved by inserting the mold member into the retainer from the radial direction through the opening of the retainer.

5 Claims, 15 Drawing Sheets

U.S. PATENT DOCUMENTS

| | | | |
|---|---|---|---|
| 7,051,602 B2 * | 5/2006 | Nakane et al. | 73/862.333 |
| 2002/0189371 A1 | 12/2002 | Nakane et al. | |
| 2003/0167857 A1 | 9/2003 | Sugimura et al. | |
| 2003/0209087 A1 | 11/2003 | Nakane et al. | |
| 2003/0233889 A1 | 12/2003 | Nakane et al. | |
| 2004/0011138 A1 * | 1/2004 | Gandel et al. | 73/847 |
| 2004/0074314 A1 | 4/2004 | Nakane et al. | |
| 2004/0074316 A1 * | 4/2004 | Nakane et al. | 73/862.333 |
| 2004/0182178 A1 * | 9/2004 | Izumi | 73/862.322 |
| 2005/0126310 A1 * | 6/2005 | Sugimura et al. | 73/862.333 |
| 2005/0241414 A1 * | 11/2005 | Nakane et al. | 73/862.333 |
| 2005/0247139 A1 * | 11/2005 | Sugimura et al. | 73/862.331 |
| 2006/0021451 A1 * | 2/2006 | Ishihara et al. | 73/862.331 |

FOREIGN PATENT DOCUMENTS

| | | |
|---|---|---|
| EP | 1 442 960 A2 | 8/2004 |
| EP | 1 536 216 A1 | 6/2005 |
| JP | 2003-149062 A | 5/2003 |
| JP | 2003-329523 A | 11/2003 |
| WO | WO-2004/005874 A1 | 1/2004 |

* cited by examiner

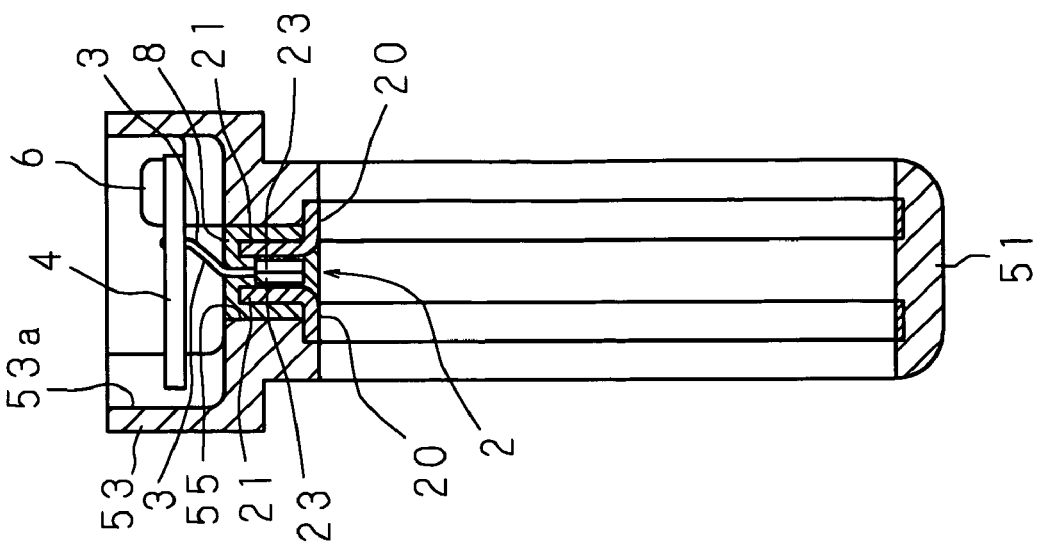
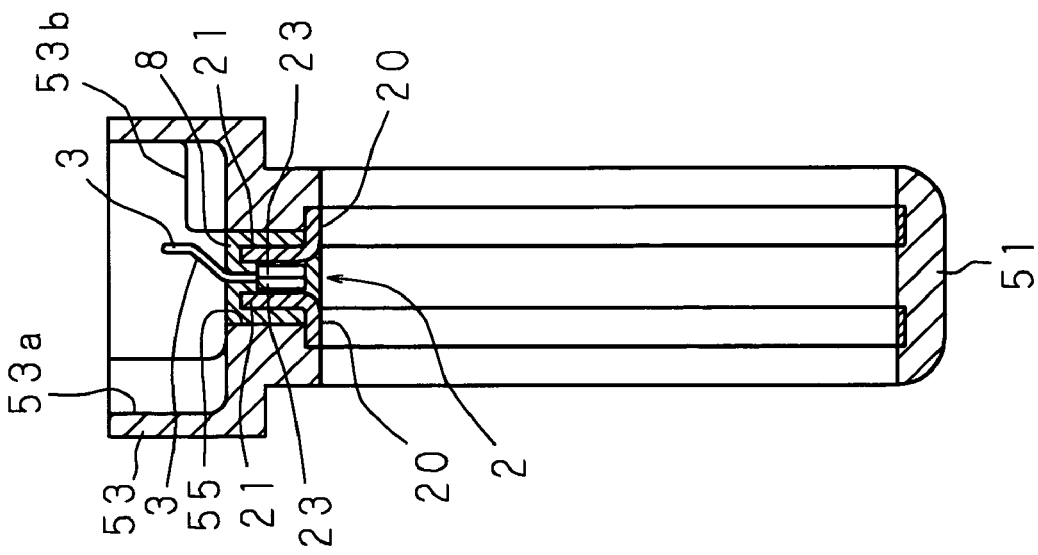
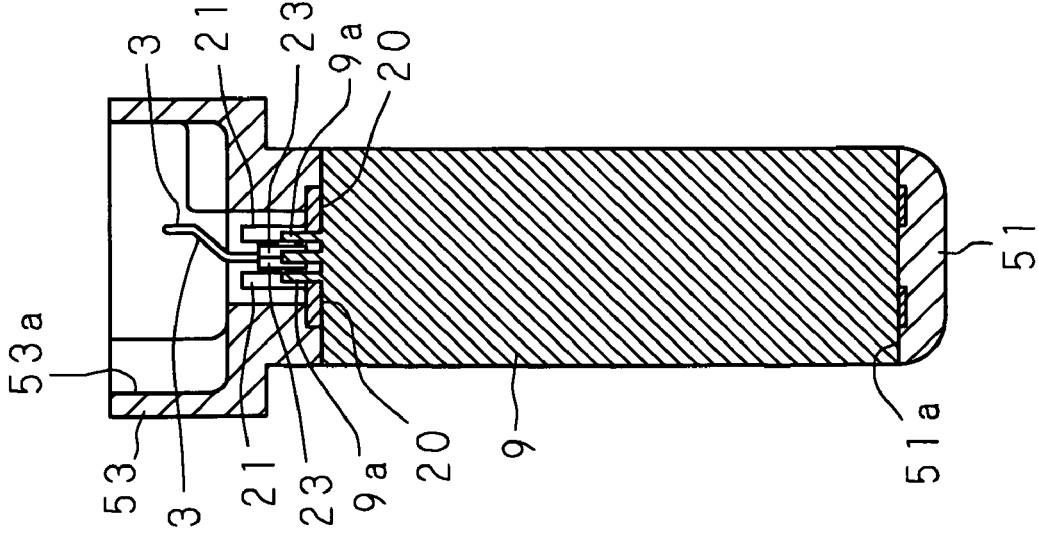

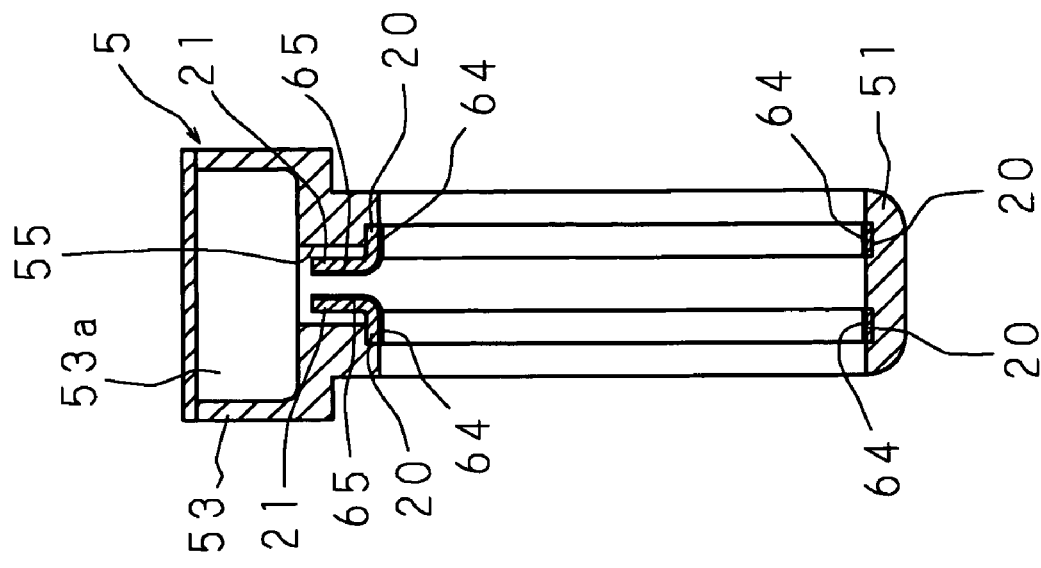
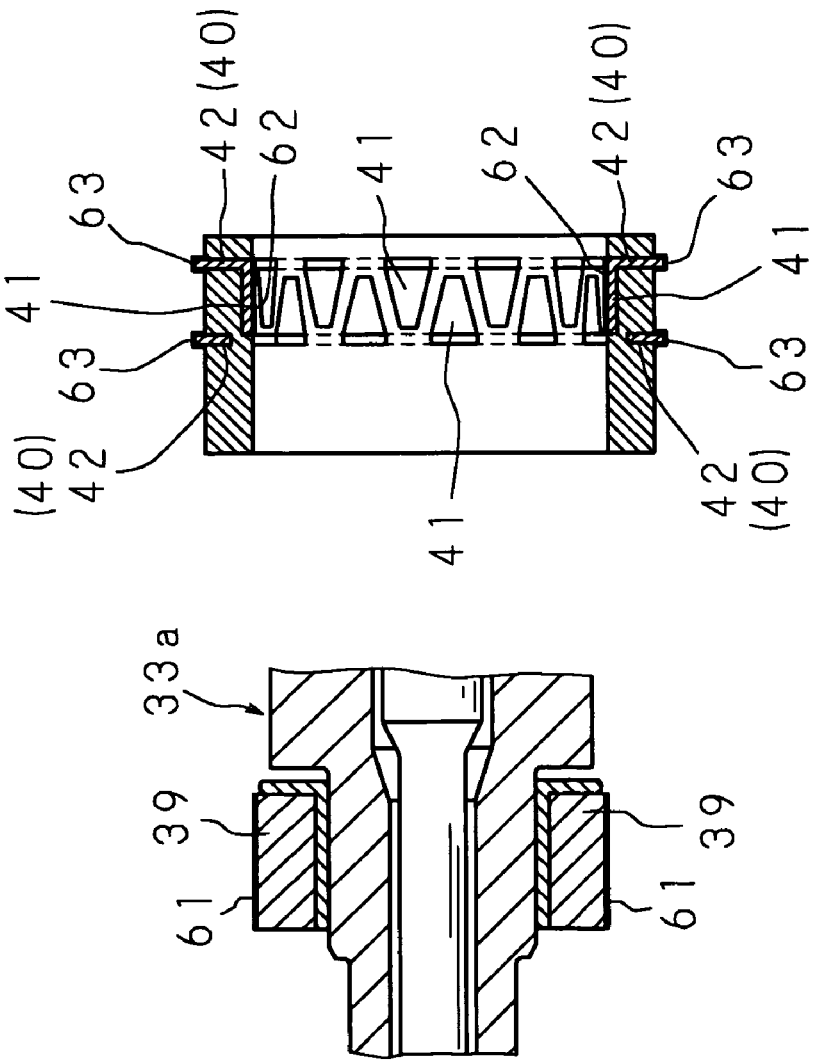

TORQUE DETECTING APPARATUS AND MANUFACTURING METHOD THEREOF

CROSS-REFERENCE TO RELATED APPLICATIONS

This Nonprovisional application claims priority under 35 U.S.C.§119(a) on Patent Application No. 2004-114349 filed in Japan on Apr. 8, 2004, and Patent Application No. 2004-122863 filed in Japan on Apr. 19, 2004, the entire contents of which are hereby incorporated by reference.

BACKGROUND OF THE INVENTION

1. Field of the Invention

The present invention relates to a torque detecting apparatus for detecting a torque applied to a rotor and a manufacturing method of the torque detecting apparatus.

2. Description of Related Art

An example of a torque detecting apparatus is disclosed in, for example, Japanese Patent Application Laid-Open No. 2003-149062. The torque detecting apparatus in Japanese Patent Application Laid-Open No. 2003-149062 comprises: an input shaft and an output shaft which are connected with each other by a torsion bar so that torque is applied thereto; a permanent magnet mounted on a peripheral portion of the input shaft and a pair of annular rotary magnetic rings which are arranged around the periphery of the permanent magnet and rotates integrally with the output shaft; a detecting unit, which is arranged around the periphery of the rotary magnetic rings, for detecting a torque applied to the input shaft; and a detection circuit board, which is connected with the detecting unit, for converting a magnetic flux density detected by the detecting unit into a voltage signal. The detecting unit has: two static magnetic rings which are arranged apart from each other in the axial direction of the rotor, have magnetism collecting projections projected from a portion thereof and are supported by a supporting member; and a magnetism sensitive element arranged between the magnetism collecting projections of the respective static magnetic rings, and the magnetism sensitive element is connected with the detection circuit board by a conductor.

The rotary magnetic rings are designed to rotate relative to the permanent magnet to change the magnetic flux density between the permanent magnet and itself in one direction and the other direction. The static magnetic rings are designed to collect the magnetic flux from the rotary magnetic rings to the magnetism collecting projections. The magnetism sensitive element is constructed with a Hall element having an electrical characteristic (resistance) to be changed by the action of the magnetic field and is constructed to change a detection signal, i.e. a detection torque, according to a change in the magnetic flux density which is generated between the magnetism collecting projections by the relative rotation.

A torque detecting apparatus constructed as mentioned above is incorporated into an electric power steering apparatus for a vehicle. An electric power steering apparatus comprises: the rotor having the input shaft linked with a steering wheel; a housing which has a cylinder portion surrounding the rotor and a retainer on which the detection circuit board is mounted in the radial direction through an opening formed at the peripheral wall of the cylinder portion; an electric motor linked with the output shaft via a reduction mechanism; and a control unit, which is connected with a drive circuit of the electric motor and with the detection circuit board and is constructed with a microprocessor, and is constructed to detect with the detecting unit (magnetism sensitive element) a rotational torque which is applied to the input shaft when the steering wheel is steered on the basis of a torsion which arises at the torsion bar and to drive the electric motor in a controlled manner on the basis of the detected torque.

The torque detecting apparatus is installed into the housing by inserting the detecting unit having the magnetism sensitive element connected with one end of the conductor into the cylinder portion from the axial direction of the housing and retaining the detecting unit in the cylinder portion. Moreover, the detection circuit board is inserted into the opening of the retainer from the radial direction and mounted in the retainer, and the other end of the conductor is connected with the detection circuit board.

In a torque detecting apparatus constructed as disclosed in Japanese Patent Application Laid-Open No. 2003-149062, however, since the detecting unit and the detection circuit board are formed separately from each other and it is necessary to connect the detecting unit with the detection circuit board by a conductor, there are problems that the number of components is large and the number of steps of the installation operation is large. Moreover, since the torque detecting apparatus is installed into an electric power steering apparatus by incorporating the detecting unit and the detection circuit board from two directions which cross each other, i.e. by inserting the detecting unit from the axial direction of the housing and inserting the detection circuit board into the retainer from the radial direction of the housing, and, further, since the detecting unit and the detection circuit board are connected with each other by a conductor after installation of the detecting unit and the detection circuit board, the installability is law and a solution has been required.

Furthermore, since a permanent magnet is used, magnetic dust such as iron powder may enter the magnetic circuit causing a short circuit of the magnetic circuit and a deviation of a detection signal of the magnetism sensitive element, and a solution has been required. Moreover, since a space exists between the permanent magnet provided on the input shaft and the rotary magnetic rings provided on the output shaft to allow relative rotation, the run-out of the input shaft and the output shaft may cause a contact between the permanent magnet and the rotary magnetic rings and a short circuit of the magnetic circuit, and a solution has been also required for this point.

BRIEF SUMMARY OF THE INVENTION

The present invention has been made with the aim of solving the above problems, and it is an object thereof to provide a torque detecting apparatus which can reduce the number of components and, further, can be incorporated from one direction.

Another object of the present invention is to provide a torque detecting apparatus which can reduce a short circuit of the magnetic circuit due to magnetic dust or a short circuit of the magnetic circuit due to run-out of the rotor.

Another object of the present invention is to provide a manufacturing method of a torque detecting apparatus which can reduce the number of components and enhance the installability into the housing.

A torque detecting apparatus according to the first aspect is a torque detecting apparatus having a detecting unit for detecting a torque applied to a rotor according to rotation of the rotor and a detection circuit board electrically connected with the detecting unit, characterized in that the detecting unit and the detection circuit board are integrated by a mold member made of synthetic resin.

Regarding the first aspect, since the detecting unit and the detection circuit board are molded to form one mold member, it is possible to reduce the number of components and the number of steps of the installation operation.

A torque detecting apparatus according to the second aspect is characterized by comprising a housing which has a cylinder portion to surround the rotor and a retainer for retaining the mold member to be fitted in the radial direction through an opening formed at a peripheral wall of the cylinder portion, wherein an outer end portion of the retainer and the mold member have locating faces for locating the detecting unit in the cylinder portion.

Regarding the second aspect, since the installation direction into a case is limited to one direction, the installability can be improved and, further, the exact location of the detecting unit in the cylinder portion can be identified easily by the locating faces.

A torque detecting apparatus according to the third aspect is characterized by having a sealing member for sealing a clearance between the locating face of the retainer and the locating face of the mold member.

Regarding the third aspect, it is possible to prevent moisture from entering the retainer of the housing from the outside and to protect the detecting unit.

A torque detecting apparatus according to the fourth aspect is a torque detecting apparatus, which comprises: a permanent magnet provided on a peripheral portion of one of a first rotor and a second rotor connected with each other; a pair of rotary magnetic rings which are arranged around the periphery of the permanent magnet and rotate integrally with the other of the first rotor and the second rotor; a plurality of static magnetic rings which are arranged around the periphery of the rotary magnetic rings apart from each other in the axial direction, have magnetism collecting projections projected in the radial direction from a portion thereof and are supported by a supporting member; and a magnetism sensitive element arranged between the magnetism collecting projections of the respective static magnetic rings, for detecting a torque applied to the rotor on the basis of a magnetic flux density sensed by the magnetism sensitive element, characterized in that an outer portion of the permanent magnet and/or a magnetism sensitive element side portion of the magnetism collecting projections is coated with a non-magnetic layer.

Regarding the fourth aspect, when the outer portion of the permanent magnet is coated with a non-magnetic layer, since it is possible to prevent magnetic dust from attaching to the permanent magnet, it is possible to reduce a short circuit of the magnetic circuit due to magnetic dust and, further, it is possible to prevent a contact between the permanent magnet and the rotary magnetic rings and a short circuit of the magnetic circuit due to run-out even when run-out arises at the first rotor and the second rotor. Moreover, when the magnetism sensitive element side portion of the magnetism collecting projections is coated with a non-magnetic layer, since it is possible to prevent magnetic dust from attaching to the magnetism sensitive element side portion of the magnetism collecting projections, it is possible to reduce a short circuit of the magnetic circuit due to magnetic dust. Moreover, when the outer portion of the permanent magnet and the magnetism sensitive element side portion of the magnetism collecting projections are coated with a non-magnetic layer, since it is possible to prevent magnetic dust from attaching to the permanent magnet and the magnetism sensitive element side portion of the magnetism collecting projections, it is possible to further reduce a short circuit of the magnetic circuit due to magnetic dust and run-out and, further, it is possible to simplify dust entering management to be performed until a torque detecting apparatus is assembled and to reduce the management cost. Moreover, it is possible to prevent a contact between the permanent magnet and the rotary magnetic rings even when run-out arises at the first rotor and the second rotor and to prevent a short circuit of the magnetic circuit due to run-out.

A torque detecting apparatus according to the fifth aspect is characterized in that at least one of an inner surface portion of each rotary magnetic ring, a peripheral portion of each rotary magnetic ring and an inner surface portion of each static magnetic ring is coated with a non-magnetic layer.

Regarding the fifth aspect, when the inner surface portion of each rotary magnetic ring is coated with a non-magnetic layer, since it is possible to prevent magnetic dust from attaching to the inner surface portion of the rotary magnetic ring, it is possible to reduce a short circuit of the magnetic circuit due to magnetic dust. Moreover, when the peripheral portion of each rotary magnetic ring is coated with a non-magnetic layer, since it is possible to prevent magnetic dust from attaching to the peripheral portion of the rotary magnetic ring, it is possible to reduce a short circuit of the magnetic circuit due to magnetic dust. Moreover, when the inner surface portion of each static magnetic ring is coated with a non-magnetic layer, since it is possible to prevent magnetic dust from attaching to the inner surface portion of the static magnetic ring, it is possible to reduce a short circuit of the magnetic circuit due to magnetic dust. Moreover, when the inner surface portion of each rotary magnetic ring, the peripheral portion of each rotary magnetic ring and the inner surface portion of each static magnetic ring are coated respectively with a non-magnetic layer, since it is possible to prevent magnetic dust from attaching to the inner surface portion of the rotary magnetic ring, the peripheral portion of the rotary magnetic ring and the inner surface portion of the static magnetic ring, it is possible to further reduce a short circuit of the magnetic circuit due to magnetic dust.

A manufacturing method of a torque detecting apparatus according to the sixth aspect is characterized by including the steps of arranging a magnetism sensitive element connected with one end of a conductor between two static magnetic rings which are arranged apart from each other and molding a portion of each static magnetic ring and the magnetism sensitive element; connecting the other end of the conductor with a detection circuit board; and molding the static magnetic rings, the detection circuit board and the conductor with synthetic resin material to form a mold member.

Regarding the sixth aspect, since the magnetism sensitive element is molded separately from the detection circuit board, the magnetism sensitive element can be located with respect to the static magnetic rings with relatively high accuracy.

With the first aspect, since the detecting unit and the detection circuit board are molded to form a mold member, it is possible to reduce the number of components and the number of steps of the installation operation.

With the second aspect, since the installation direction into a housing is limited to one direction, the installability can be improved and, further, the exact location of the detecting unit in the cylinder portion can be identified easily by the locating faces.

With the third aspect, it is possible to prevent moisture from entering the retainer of the housing from the outside and to protect the detecting unit.

With the fourth aspect, since one or both of the outer portion of the permanent magnet and the magnetism sensitive element side portion of the magnetism collecting projections of the static magnetic rings are coated with a non-magnetic layer, it is possible to reduce a short circuit of the magnetic circuit due to magnetic dust and run-out. It is also possible to simplify dust entering management to be performed until a torque detecting apparatus is assembled and to reduce the management cost.

With the fifth aspect, since any one of the inner surface portion of the rotary magnetic ring, the peripheral portion of the rotary magnetic ring and the inner surface portion of the static magnetic ring is coated with a non-magnetic layer, it is possible to further reduce a short circuit of the magnetic circuit due to magnetic dust and run-out. It is also possible to simplify dust entering management to be performed until a torque detecting apparatus is assembled and to reduce the management cost.

With the sixth aspect, since the magnetism sensitive element is molded separately from the detection circuit board, the magnetism sensitive element can be located with respect to the static magnetic ring with relatively high accuracy.

The above and further objects and features of the invention will more fully be apparent from the following detailed description with accompanying drawings.

BRIEF DESCRIPTION OF THE SEVERAL VIEWS OF THE DRAWINGS

FIGS. 7A, 7B and 7C are explanatory views showing the manufacturing steps of the torque detecting apparatus according to Embodiment 1 of the present invention;

FIGS. 14A, 14B and 14C are sectional views showing the structure of the essential portion according to Embodiment 2 of the present invention in an exploded manner.

DETAILED DESCRIPTION OF THE INVENTION

The following description will explain the present invention in detail with reference to the drawings illustrating some embodiments thereof.

Embodiment 1

Figure 1:
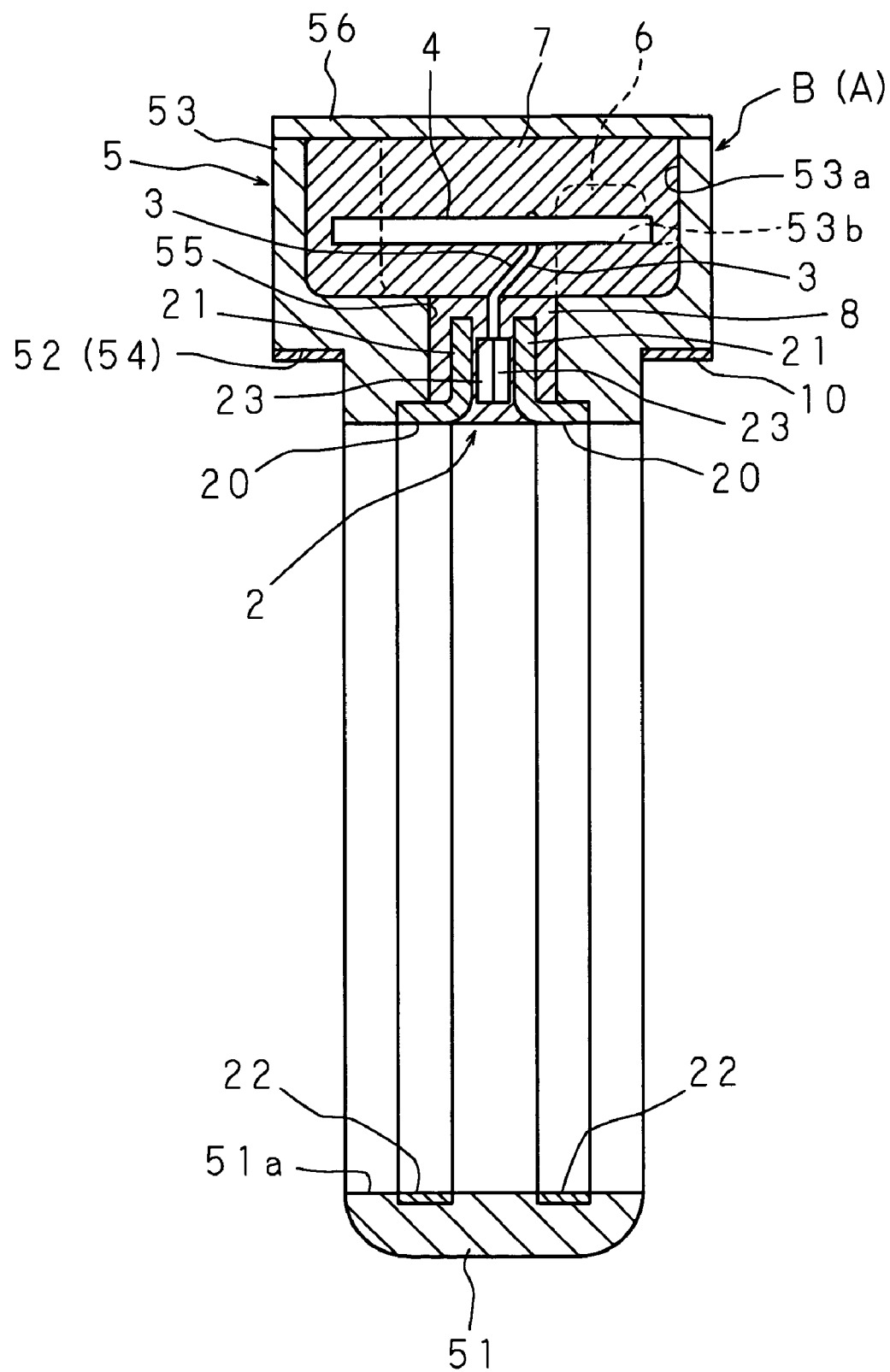
FIG. 1 is a sectional view showing the structure of a torque detecting apparatus according to Embodiment 1 of the present invention.
Figure 2:
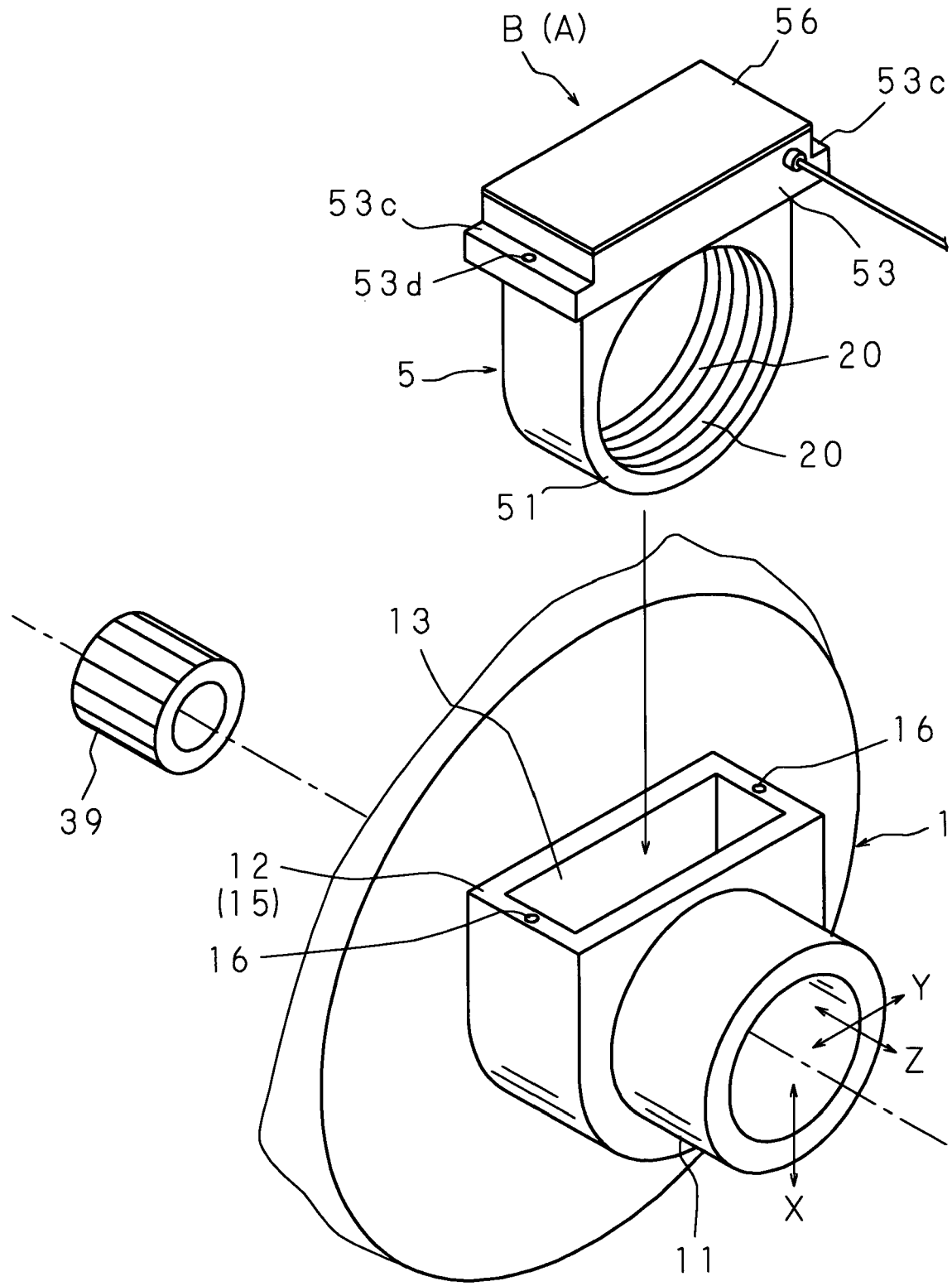
FIG. 2 is an exploded perspective view of a mold member and a housing of the torque detecting apparatus according to Embodiment 1 of the present invention.
Figure 3:
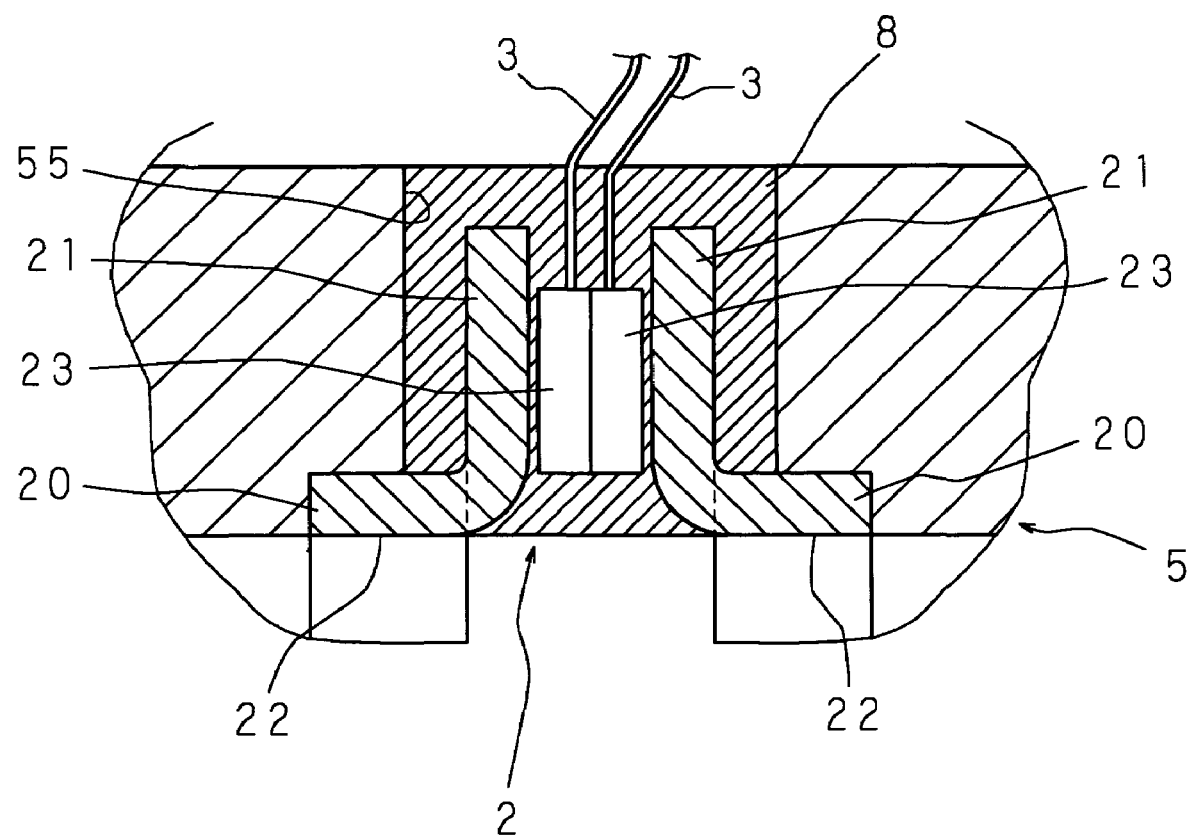
FIG. 3 is a sectional view showing a portion of the torque detecting apparatus according to Embodiment 1 of the present invention in an enlarged manner.
Figure 4:
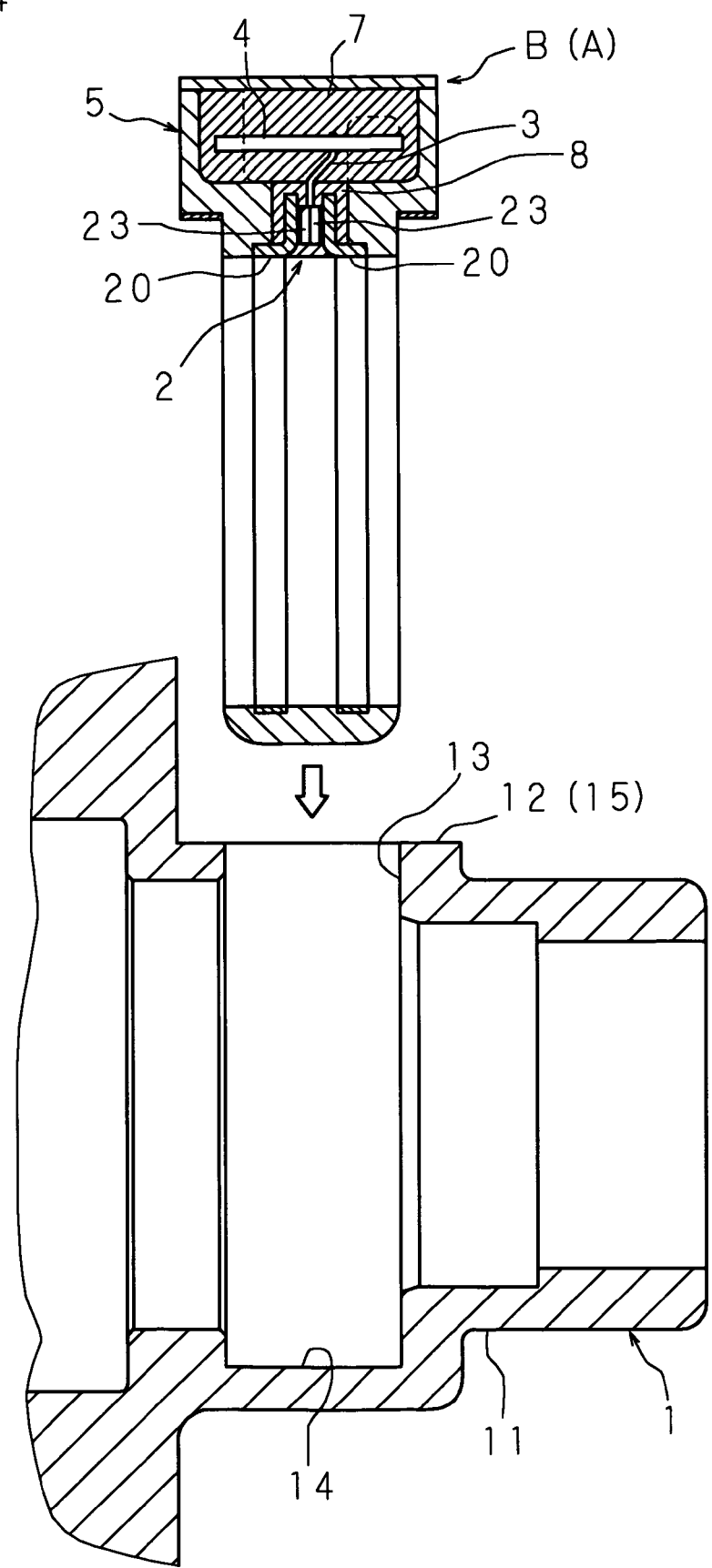
FIG. 4 is an explanatory view of installation of the mold member of the torque detecting apparatus according to Embodiment 1 of the present invention into the housing.
Figure 5:
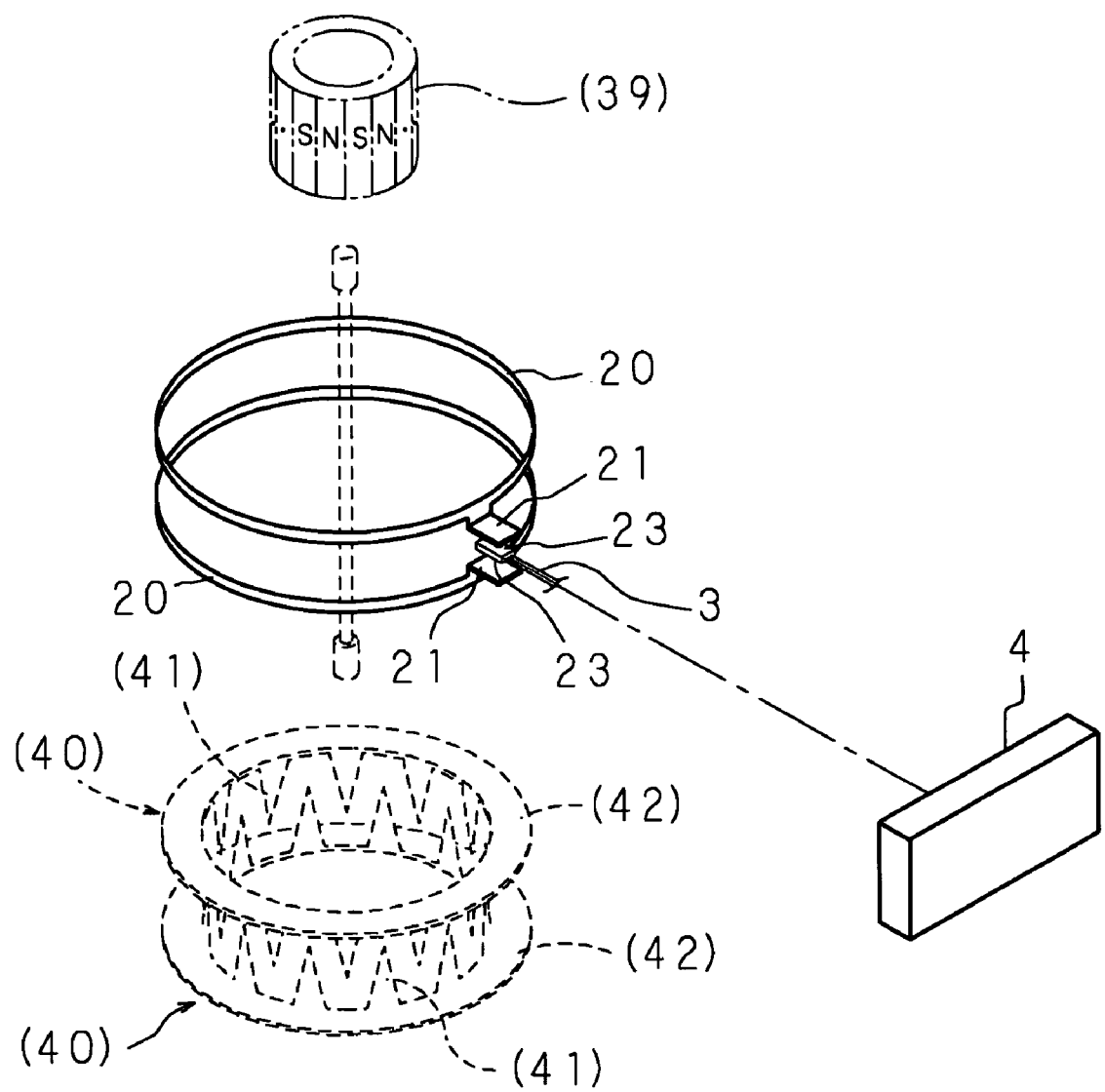
FIG. 5 is a perspective view showing a portion of the torque detecting apparatus according to Embodiment 1 of the present invention in an exploded manner.
Figure 6:
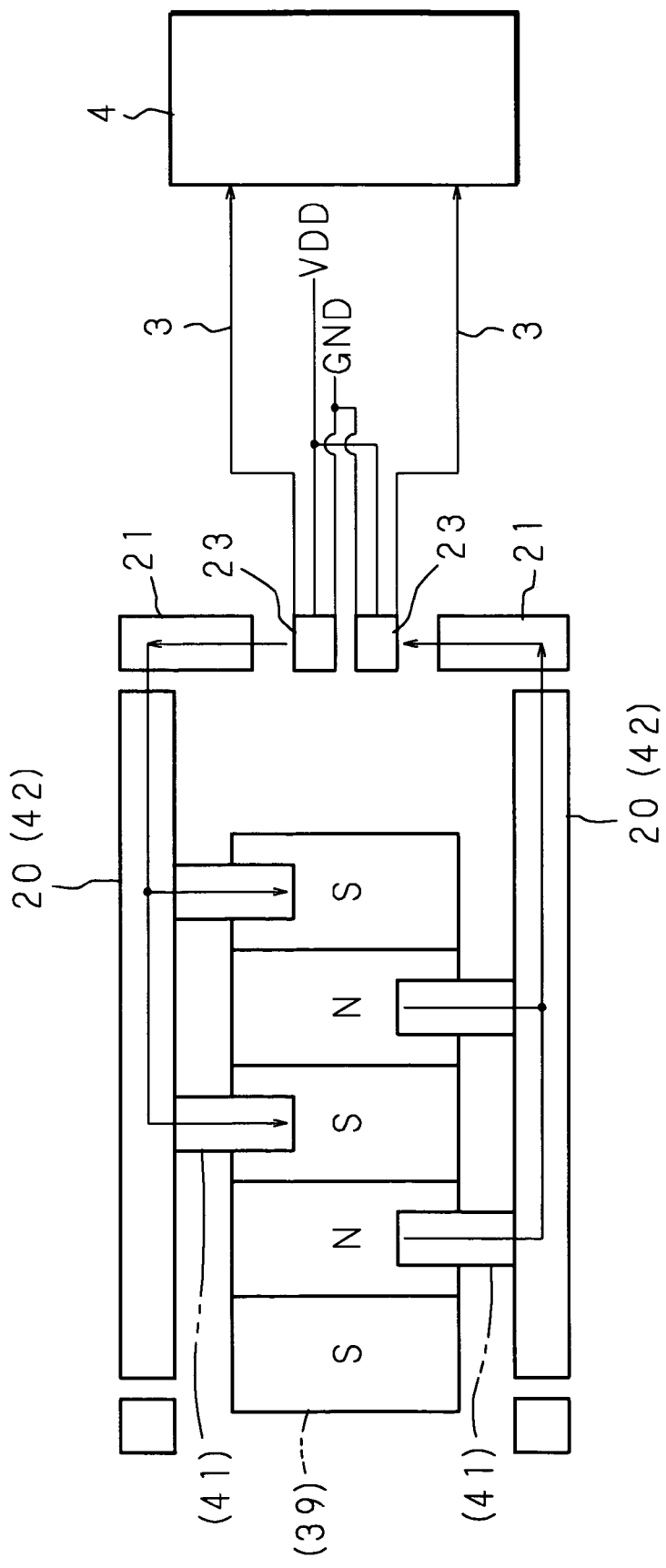
FIG. 6 is an explanatory view of a magnetic circuit which is generated when a rotor according to Embodiment 1 of the present invention rotates in one direction.

FIG. 1 is a sectional view showing the structure of a torque detecting apparatus according to Embodiment 1 of the present invention; FIG. 2 is an exploded perspective view of a mold member and a housing; FIG. 3 is a sectional view showing a portion in an enlarged manner; FIG. 4 is an explanatory view of installation of the mold member into the housing; FIG. 5 is a perspective view showing a portion in an exploded manner; and FIG. 6 is an explanatory view of a magnetic circuit which is generated when a rotor rotates in one direction.

A torque detecting apparatus A comprises: a cylindrical housing 1 surrounding a rotor which is composed of an input shaft and an output shaft connected coaxially with each other by a torsion bar and has a permanent magnet and a pair of rotary magnetic rings that can freely rotate relatively; a detecting unit 2 which is arranged around the periphery of the rotary magnetic rings provided on the rotor in the housing 1; and a detection circuit board 4 connected with the detecting unit 2 by a conductor 3.

The housing 1 has: a cylinder portion 11 surrounding the rotor; a mount 12 projected from one position of the peripheral portion of the cylinder portion 11; a retainer 13 which has an opening at the mount 12 in the radial direction; and a fitting groove 14 which extends from the retainer 13 and is curved along the detecting unit 2. The retainer 13 has a rectangular sectional form larger than the outside diameter and the width of the detecting unit 2. The mount 12 is provided with a flat locating face 15 parallel to the central axis of the housing 1 and with a plurality of mounting bores 16 and 16 formed at the locating face 15.

The detecting unit 2 is arranged around the periphery of the rotary magnetic rings so as to be able to freely rotate relatively and has: two static magnetic rings 20 and 20 provided with magnetism collecting projections 21 and 21 which face each other at one circumferential position; and magnetism sensitive elements 23 and 23 arranged between the respective magnetism collecting projections 21 and 21. The magnetism sensitive elements 23 and 23 are connected with one ends of conductors 3 and 3. The static magnetic rings 20 and 20 are retained at a case 5 made of synthetic resin. Moreover, the static magnetic rings 20 and 20 are designed to collect the magnetic flux from the rotary magnetic rings and are provided with planar magnetism collecting projections 21 and 21 formed at one circumferential position. The respective magnetism collecting projections 21 and 21 face each other.

The case 5 comprises: an annular portion 51 having a through bore 51a corresponding to inner surface 22 and 22 of the static magnetic rings 20 and 20; and a closed-end rectangular cylinder portion 5 which extends from a peripheral portion of the annular portion 51 in the radial direction through a shoulder 52 in the axial direction and has a holder 53a. The shoulder 52 is provided with a flat locating face 54 which faces the locating face 15. The holder 53a is provided with a seat 53b on which the detection circuit board 4 is mounted with a plurality of machine screws 6. The detection circuit board 4 and the other end portions of the conductors 3 and 3 are molded in the holder 53a with synthetic resin material to be integrated with the case 5 by a synthetic resin portion 7 after the other ends of the conductors 3 and 3 are connected with the detection circuit board 4 by soldering or the like. Moreover, the case 5 has a communicating bore 55 which is formed by penetrating the bottom face of the rectangular cylinder portion 53 to be communicated with the holder 53a and with the through bore 51a, and the magnetism collecting projections 21 and 21 and the magnetism sensitive elements 23 and 23 are arranged at this communicating bore 55. These magnetism collecting projections 21 and 21 and magnetism sensitive elements 23 and 23 and one end portions of the conductors 3 and 3 are molded in the communicating bore 55 with synthetic resin material to be integrated with the case 5 by a synthetic resin portion 8. Moreover, two mounting tongues 53c and 53c are projected from the peripheral portion of the rectangular cylinder portion 53, and mounting bores 53d and 53d corresponding to the mounting bores 16 and 16 are provided at these mounting tongues 53c and 53c. Moreover, an electromagnetic shielding member 56 for shielding the detecting unit 2 from the effect of electrostatic and magnetic induction from the outside is attached with machine screws or the like at an opening end of the rectangular cylinder portion 53 to the outside.

The magnetism sensitive elements 23 and 23 are made of Hall elements having an electrical characteristic (resistance) to be changed by the action of the magnetic field and are constructed to change a detection signal according to a change in the magnetic flux density which is generated between the magnetism collecting projections 21 and 21 of the static magnetic rings 20 and 20. The detection signal is given to the detection circuit board 4.

FIGS. 7A, 7B and 7C are explanatory views showing the manufacturing steps of the torque detecting apparatus according to Embodiment 1 of the present invention. Referring also to FIG. 1, the torque detecting apparatus A constructed as described above is manufactured in the following steps.

(1) To arrange a mold 9 having a plurality of locating protrusions 9a inside the static magnetic rings 20 and 20 which are fitted and retained in the through bore 51a of the case 5; fit the locating protrusions 9a into the communicating bore 55 of the case 5; insert the magnetism sensitive elements 23 and 23 preliminarily connected with the conductors 3 and 3 into the communicating bore 55 from the holder 53a; locate the magnetism sensitive elements 23 and 23 with respect to the magnetism collecting projections 21 and 21 by the locating protrusions 9a; pour synthetic resin material into the communicating bore 55 in this locating state; mold the magnetism collecting projections 21 and 21, the magnetism sensitive elements 23 and 23 and one end portions of the conductors 3 and 3; and form a mold member in which the static magnetic rings 20 and 20, the magnetism sensitive elements 23 and 23, the conductors 3 and 3 and the case 5 are integrated by the synthetic resin portion 8.

(2) To insert the detection circuit board 4 into the holder 53a of the case 5; mount the detection circuit board 4 on the seat 53b with the machine screws 6; and then connect the other ends of the conductors 3 and 3 with the detection circuit board 4 by soldering. These conductors 3 and 3 are loosened in the holder 53a.

(3) To pour synthetic resin material similar to that of the synthetic resin portion 8 into the holder 53a of the case 5; mold the detection circuit board 4 and the other end portions of the conductors 3 and 3; and form a mold member B in which the static magnetic rings 20 and 20, the magnetism sensitive elements 23 and 23, the conductors 3 and 3, the detection circuit board 4 and the case 5 are integrated by the synthetic resin portion 7. An annular sealing member 10 made of elastic material such as synthetic rubber or synthetic resin is fitted and retained around this mold member B and is in contact with the locating face 54.

(4) To insert the mold member B into from the retainer 13 which has an opening in the radial direction and is provided at the housing 1; fit the annular portion 51 of the case 5 into the fitting groove 14; make the sealing member 10 of the mold member B come in contact with the locating face 15 of the housing 1; fix the mold member B at the mount 12 with machine screws to be inserted into the mounting bores 53d and 53d formed at the mounting tongues 53c and 53c and into the mounting bores 16 and 16 formed at the locating face 15; and integrate the mold member B and the housing 1.

Since the molding operation is divided into two steps as described above wherein the magnetism sensitive elements 23 and 23 are located in one step and the magnetism sensitive elements 23 and 23 and the static magnetic rings 20 and 20 are molded while keeping this locating status, it is possible to prevent a deviation of the location of the magnetism sensitive elements 23 and 23 due to the input pressure of the synthetic resin material for molding, to retain the exact location with respect to the magnetism collecting projections 21 and 21 and to avoid lowering of the detection accuracy of the magnetic flux density. Further, it is possible to prevent an excessive pressure from being applied to the connecting portion of the conductors 3 and 3 and the magnetism sensitive elements 23 and 23 during pouring of synthetic resin material and to keep the precise connecting status of the conductors 3 and 3.

Moreover, since it is possible to perform molding with the conductors 3 and 3 being loosened without relation to the magnetism sensitive elements 23 and 23 in the other step, the connecting state of the conductors 3 and 3 can be kept by extending the conductor 3 even when a tension is applied to the conductor for, for example, connecting the conductor 3 with the detection circuit board 4 or mounting the detection circuit board 4 on the case 5.

Moreover, when the mold member B is installed into the housing 1, since the mount 12 of the housing 1 is provided with the locating face 15 and the case 5 of the mold member B is provided with the locating face 54 which faces the locating face 15, it is possible to locate the mold member B in an insertion direction into the housing 1 (X direction in FIG. 2), in a radial direction vertical to the insertion direction (Y direction in FIG. 2) and in the longitudinal direction in the housing 1 (Z direction in FIG. 2), that is, the mold member B can be located in three directions, and centering of the detecting unit 2 can be performed, so that the exact location of the detecting unit 2 in the cylinder portion 11 can be easily identified and the installability of the mold member B into the housing 1 can be enhanced.

Moreover, when the mold member B is installed into the housing 1, the location of the detecting unit 2 with respect to the rotation center axis of the rotor which is arranged so as to be freely rotatable in the housing 1 can be adjusted easily by interposing a thin adjustment sheet between the sealing member 10 and the locating face 15 or 54.

Figure 8:
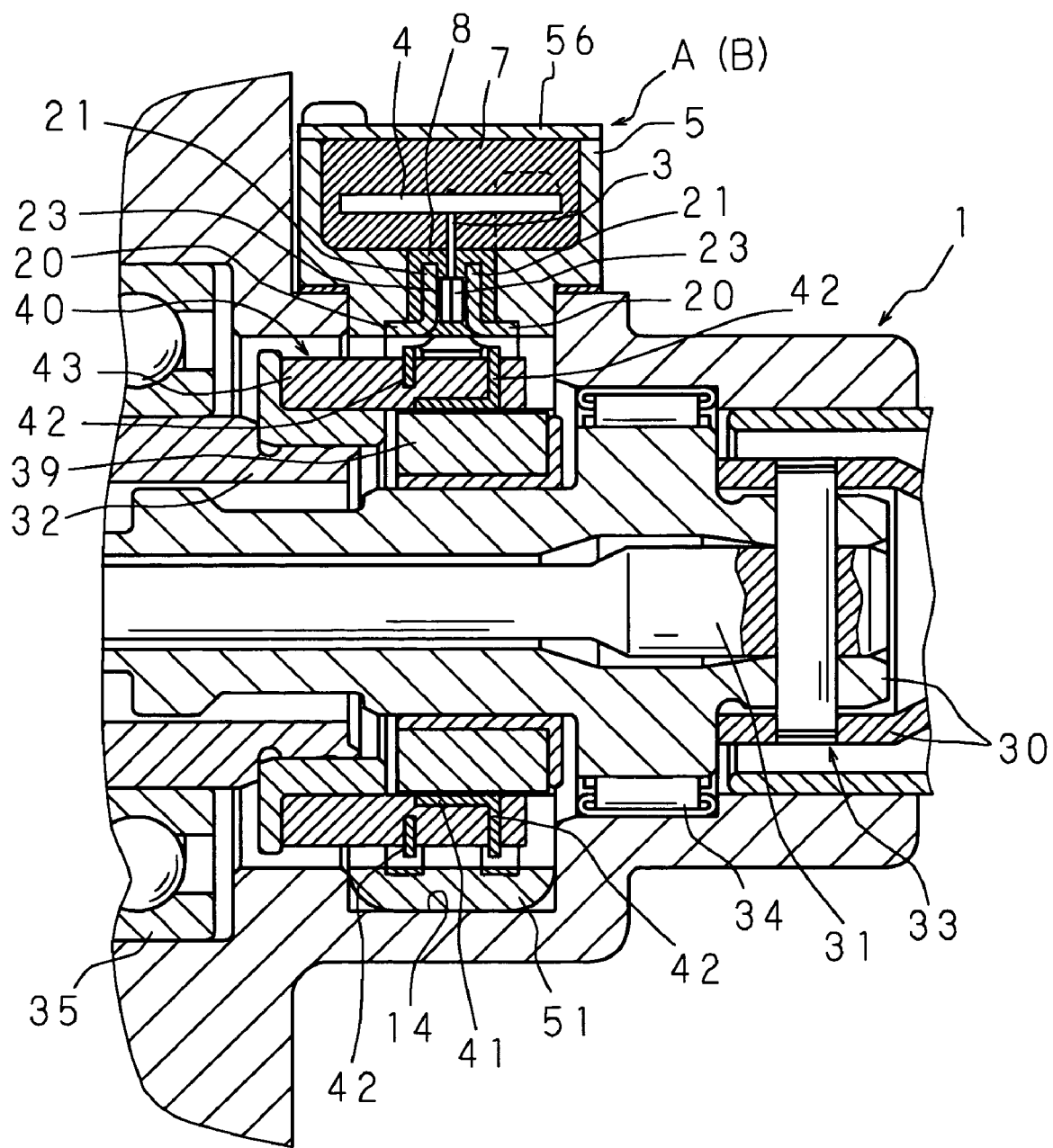
FIG. 8 is an enlarged sectional view showing an example of the torque detecting apparatus according to Embodiment 1 of the present invention used in an electric power steering apparatus.
Figure 9:
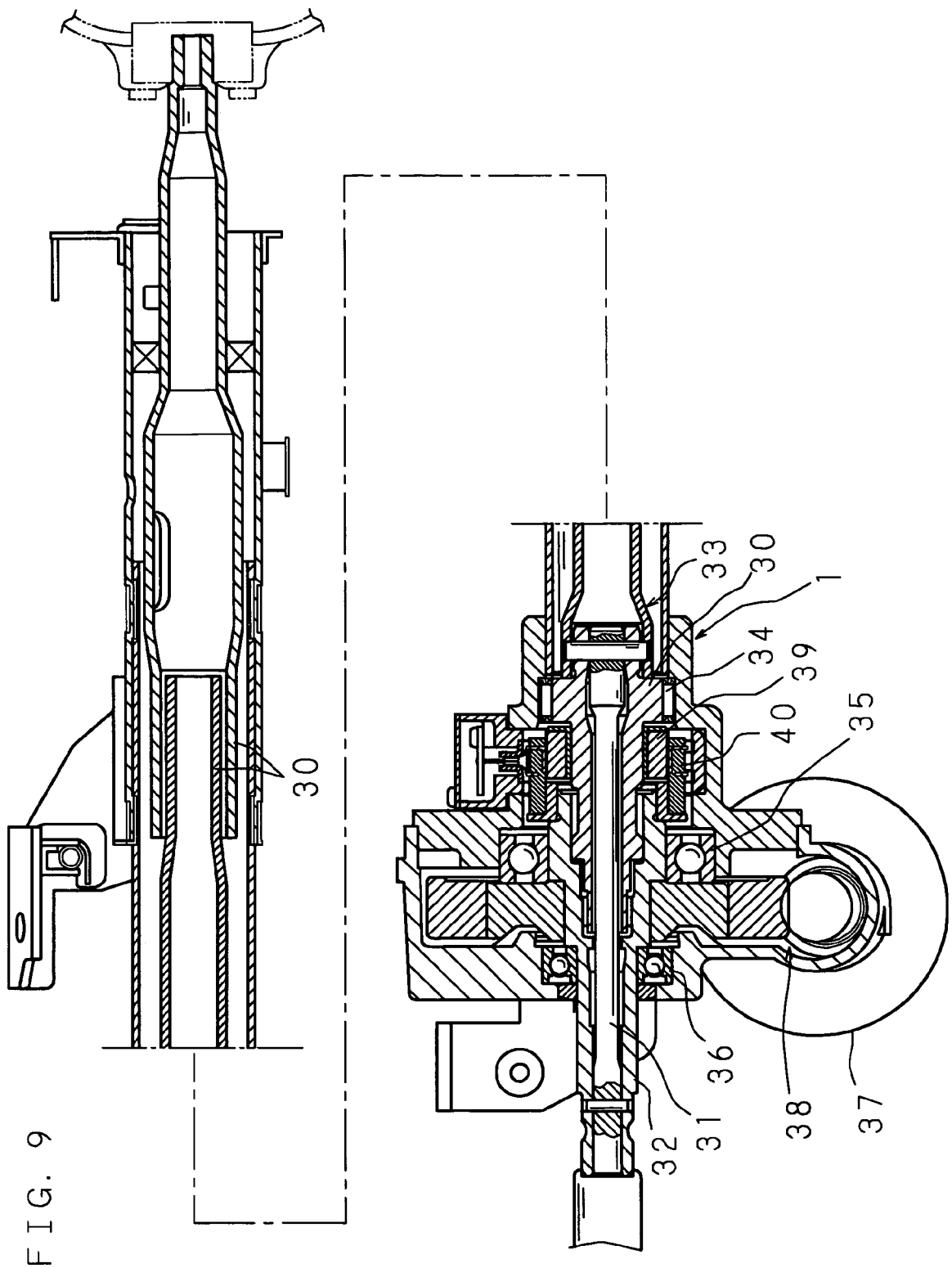
FIG. 9 is a sectional view showing the entire structure of the electric power steering apparatus according to Embodiment 1 of the present invention.

FIG. 8 is an enlarged sectional view showing an example used in an electric power steering apparatus according to Embodiment 1 of the present invention; and FIG. 9 is a sectional view showing the entire structure of the electric power steering apparatus. The torque detecting apparatus A constructed as described above is used in, for example, an electric power steering apparatus for a vehicle. This electric power steering apparatus comprises: a rotor 33 having an input shaft 30 linked with a steering wheel and an output shaft 32 connected coaxially with the input shaft 30 by a torsion bar 31; a housing 1 which surrounds the rotor 33 and supports the rotor 33 with three bearings 34, 35 and 36 so as to be freely rotatable; an electric motor 37 for steering assist which is mounted on the housing 1; a reduction mechanism 38 for transmitting the turning force of the drive shaft of the electric motor 37 to the output shaft 32; a permanent magnet 39 provided on a peripheral portion of the input shaft 30; a pair of rotary magnetic rings 40 and 40 which are arranged around the periphery of the permanent magnet 39 so as to be freely rotatable and are connected with the output shaft 32; a mold member B arranged around the periphery of the rotary magnetic rings 40 and 40; and a control unit (not illustrated in the figures) composed of a detection circuit board 4 of the mold member B and a microprocessor to be connected with the drive circuit of the electric motor 37. When the steering wheel is steered, the detecting unit 2 of the mold member B detects a rotational torque applied to the input shaft 30 on the basis of a torsion which arises at the torsion bar 31, the detection torque is converted into a voltage signal by the detection circuit board 4 and then given to the control unit, and the electric motor 37 is driven in a controlled manner with an indication signal outputted from the control unit, so that the output shaft 32 is rotated via the reduction mechanism 38.

Referring to FIG. 6, the permanent magnet 39 is a multi-pole magnetic ring having a plurality of N poles and S poles alternately at circumferential positions. The rotary magnetic rings 40 and 40 comprise: a plurality of comb-shaped teeth 41 arranged at a distance to face each other at a plurality of circumferential positions and two annular plate portions 42 and 42 which are arranged at a distance to face each other in the longitudinal direction of the permanent magnet 39. A retaining ring 43 made of synthetic resin for integrating the respective annular plate portions 42 and 42 is mounted on the output shaft 32. Moreover, the rotary magnetic rings 40 and 40 are constructed to change the magnetic flux density between the annular plate portions 42 and 42 when the permanent magnet 39 and the rotary magnetic rings 40 and 40 are relatively rotated. It should be noted that the comb-shaped teeth 41 of the annular plate portions 42 and 42 are arranged at the same intervals to engage alternately in the circumferential direction.

When the mold member B is installed, the permanent magnet 39 and the rotary magnetic rings 40 and 40 can be arranged in the detecting unit 2 by inserting the mold member B from the radial direction into the retainer 13 having an opening in the radial direction of the housing 1, fixing the mold member B at the mount and then inserting the input shaft 30 and the output shaft 32 into the housing 1 from the axial direction of the housing 1. The mold member B thus can be installed from one direction.

It should be noted that, though the torque detecting apparatus A explained above comprises the housing 1, a torque detecting apparatus may be constructed with the mold member B by taking off the housing 1.

Moreover, though the torque detecting apparatus A explained above comprises the synthetic resin portions 7 and 8 separately from the case 5, a mold member in which the static magnetic rings 20 and 20, the magnetism sensitive elements 23 and 23, the conductors 3 and 3 and the detection circuit board 4 are integrated may be formed by taking off the case 5. In this case, a mold member having the same shape as one comprising, for example, the case 5 may be formed by molding static magnetic rings 20 and 20, the magnetism sensitive elements 23 and 23 and one end portions of the conductors 3 and 3 and molding this synthetic resin, the detection circuit board 4 and the other end portions of the conductors 3 and 3. When a case is taken off in this manner, a locating face (15) is provided at a synthetic resin shoulder corresponding to the shoulder 52.

Moreover, molding may be performed in one step instead of divided two steps. Moreover, the conductors 3 and 3 may not be single wire but have a connecter along the line Moreover, though the magnetism sensitive elements 23 and 23 in the embodiment explained above are constructed with Hall elements, the magnetism sensitive elements 23 and 23 are not limited to the Hall elements but may be elements, such as magneto-resistance effect elements (MR elements), having an electrical characteristic (resistance) to be changed by the action of the magnetic field.

Moreover, instead of use in an electric power steering apparatus, the torque detecting apparatus A according to the present invention may be used in an apparatus other than an electric power steering apparatus.

Embodiment 2

Figure 10:
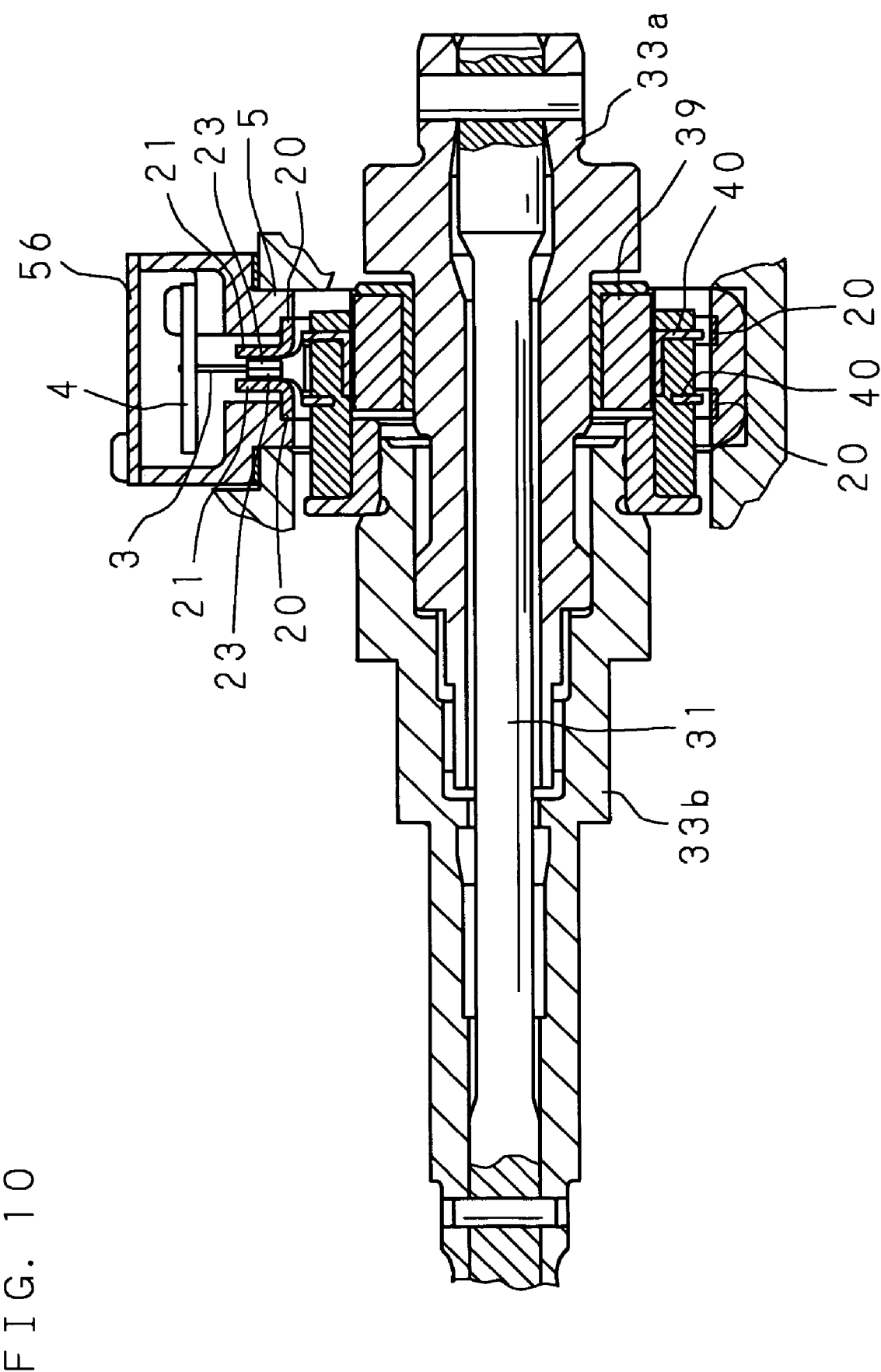
FIG. 10 is a vertical sectional view showing the structure of a torque detecting apparatus according to Embodiment 2 of the present invention.
Figure 11:
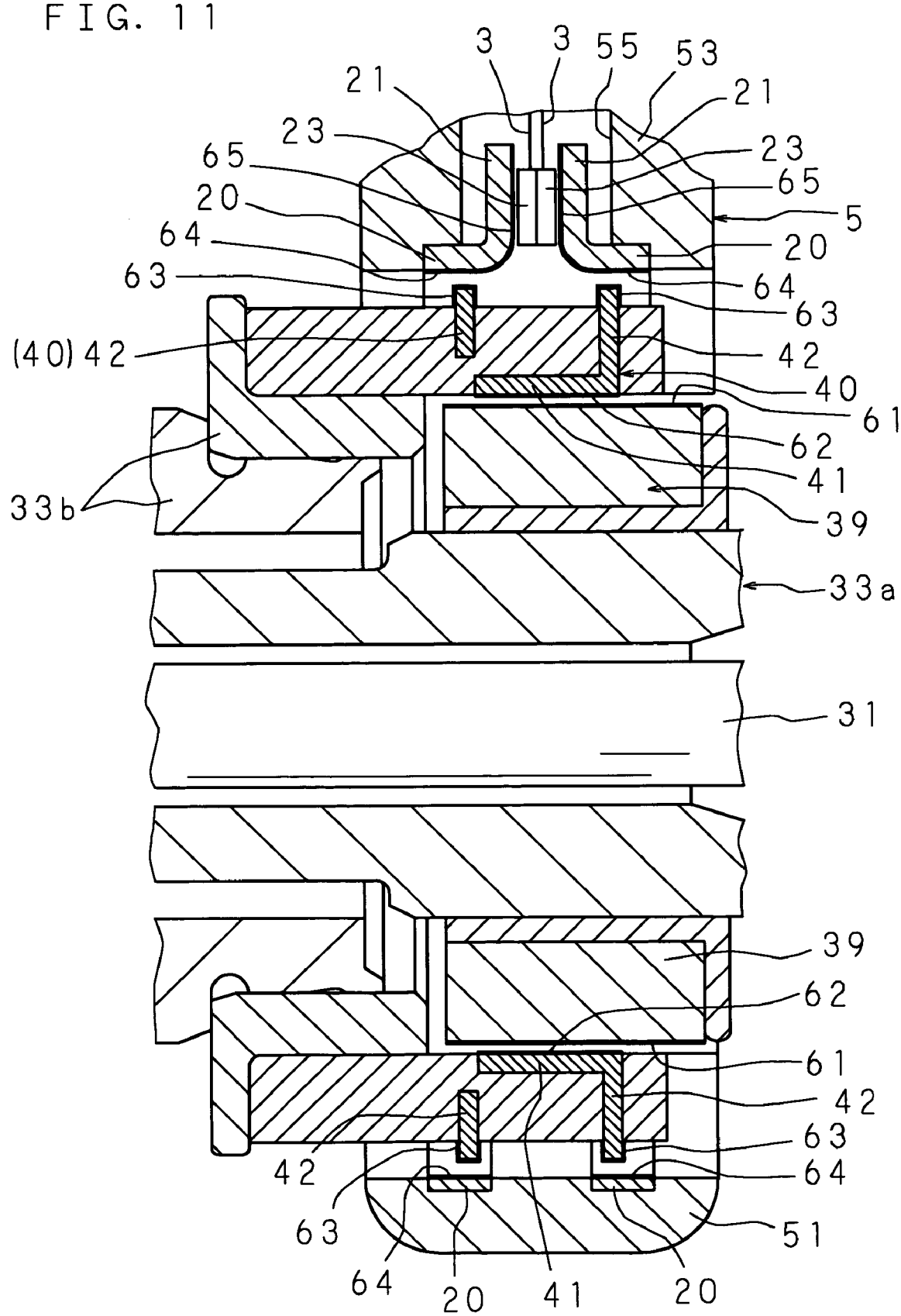
FIG. 11 is an enlarged sectional view of the torque detecting apparatus according to Embodiment 2 of the present invention.
Figure 12:
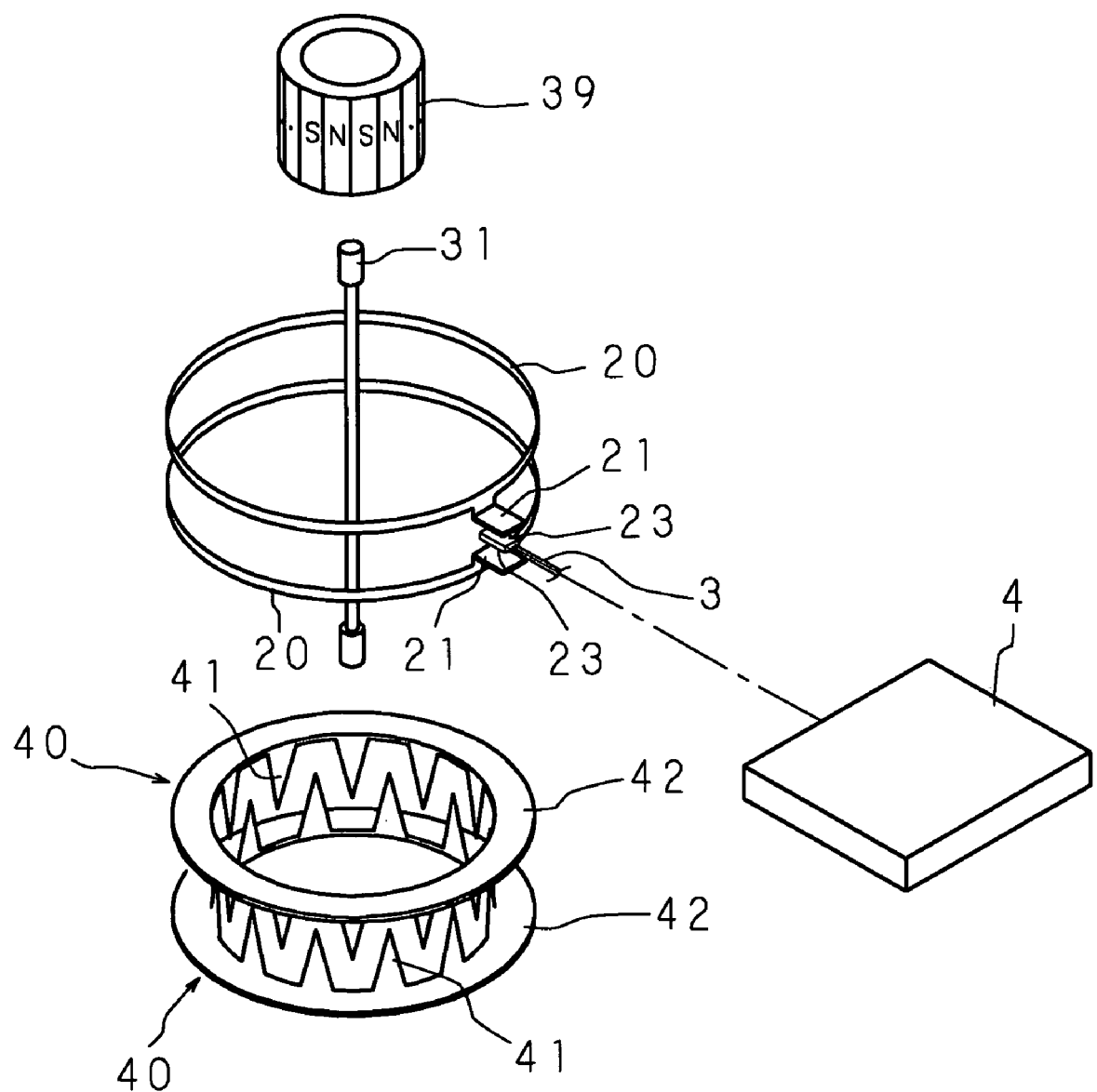
FIG. 12 is an exploded perspective view of an essential portion according to Embodiment 2 of the present invention.
Figure 13:
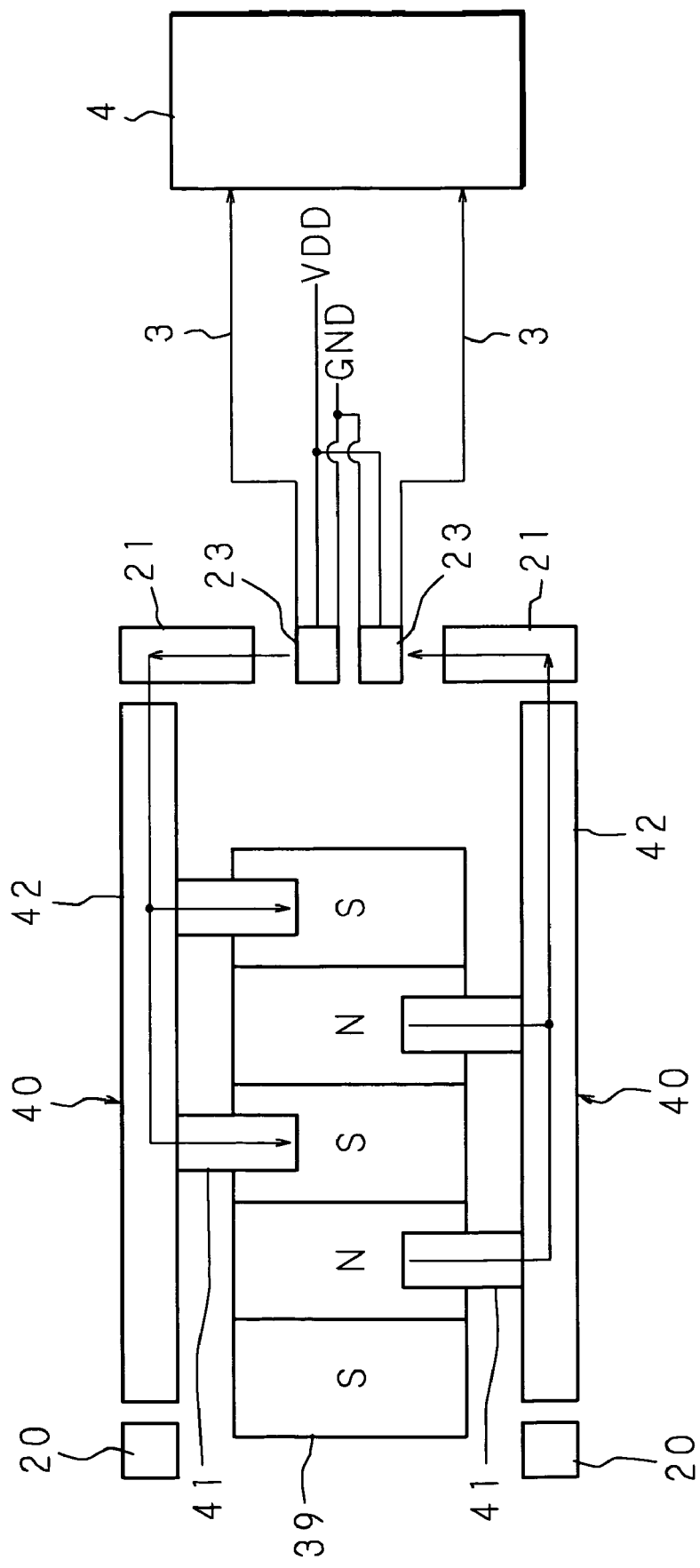
FIG. 13 is an explanatory view of a magnetic circuit which is generated when a rotor according to Embodiment 2 of the present invention rotates in one direction.

FIG. 10 is a vertical sectional view showing the structure of a torque detecting apparatus according to Embodiment 2 of the present invention; FIG. 11 is an enlarged sectional view of the torque detecting apparatus; FIG. 12 is an exploded perspective view of an essential portion; FIG. 13 is an explanatory view of a magnetic circuit which is generated when a rotor rotates in one direction; and FIGS. 14A, 14B and 14C are sectional views showing the structure of the essential portion in an exploded manner. The same codes are used to refer to the same components as Embodiment 1 and detailed explanation thereof is omitted.

A torque detecting apparatus A comprises: a permanent magnet 39 provided at a peripheral portion of a first rotor 33a; a pair of rotary magnetic rings 40 and 40 which are arranged around the periphery of the permanent magnet 39 and are provided at a second rotor 33b that is connected coaxially with the first rotor 33a by a torsion bar 31; two static magnetic rings 20 and 20 which are arranged around the periphery of the rotary magnetic rings 40 and 40 so as to be able to freely rotate relatively, have magnetism collecting projections 21 and 21 projected from one portion thereof and are supported by a case 5 which functions as a supporting member; magnetism sensitive elements 23 and 23 arranged between the magnetism collecting projections 21 and 21 of the static magnetic rings 20 and 20; and a detection circuit board 4 connected with the magnetism sensitive elements 23 and 23 by conductors 3 and 3, and is constructed to form a magnetic circuit by the permanent magnet 39, the rotary magnetic rings 40 and 40 and the static magnetic rings 20 and 20.

The rotary magnetic rings 40 and 40 have two annular plate portions 42 and 42 arranged at a distance to face each other in the axial direction of the second rotor 33b and a plurality of comb-shaped teeth 41 and 41 extending toward each other from inner surface portions of the annular plate portions 42 and 42, and are constructed to change the magnetic flux density between the rotary magnetic rings 40 and 40 when being rotated relative to the permanent magnet 39. Moreover, the comb-shaped teeth 41 and 41 are arranged at the same intervals to be engaged alternately in the circumferential direction, and the rotary magnetic rings 40 and 40 are molded with synthetic resin material in a state where the comb-shaped teeth 41 and 41 are engaged alternately to form a mold member. This mold member coats the both sides of the annular plate portions 42 and 42 and a portion between the annular plate portions 42 and 42 but does not coat the peripheral portion of the annular plate portions 42 and 42 and the inner surface portion of the comb-shaped teeth 41 and 41.

The static magnetic rings 20 and 20 are designed to collect the magnetic flux from the rotary magnetic rings 40 and 40, are arranged around the periphery of the rotary magnetic rings 40 and 40 so as to be able to freely rotate relatively, are provided with planar magnetism collecting projections 21 and 21 facing each other at one circumferential position and are constructed to collect the magnetic flux to the magnetism collecting projections 21 and 21. Moreover, the static magnetic rings 20 and 20 are retained by a case 5 made of synthetic resin which functions as a supporting member.

The case 5 has: an annular portion 51 having a through bore corresponding to the inner surface of the static magnetic rings 20 and 20; and a closed-end rectangular cylinder potion 53 which extends from the peripheral portion of the annular portion 51 in the radial direction and has a holder 53a, wherein the annular portion 51 and the holder 53a are communicated with each other through a communicating bore 55. The static magnetic rings 20 and 20 are fitted and fixed in the annular portion 51, and magnetism collecting projections 21 and 21 of the static magnetic rings 20 and 20 are arranged at the communicating bore 55. Moreover, a detection circuit board 4 is mounted on the holder 53a with machine screws. Moreover, an electromagnetic shielding member 56 for shielding the magnetism sensitive element 23 from the effect of electrostatic and magnetic induction from the outside is mounted with machine screws or the like on an opening end of the rectangular cylinder portion 53 to the outside.

The magnetism sensitive element 23 is made of a Hall element having an electrical characteristic (resistance) to be changed by the action of the magnetic field and is constructed to change a detection signal according to a change in the magnetic flux density which is generated between the magnetism collecting projections 21 and 21 of the static magnetic rings 20 and 20. The detection signal is given to the detection circuit board 4. It should be noted that, instead of a Hall element, the magnetism sensitive element 23 may be an element, such as a magneto-resistance effect element (MR element), having an electrical characteristic (resistance) to be changed by the action of the magnetic field and is not limited to the Hall element.

Regarding the torque detecting apparatus constructed as described above, the outer portion (peripheral portion) of the permanent magnet 39, the inner surface portion of the rotary magnetic rings 40 and 40, the peripheral portion of the rotary magnetic rings 40 and 40, the inner surface portion of the static magnetic rings 20 and 20 and the inner side (magnetism sensitive element side) of the magnetism collecting projections 21 and 21 of the static magnetic rings 20 and 20 are coated with synthetic resin material and non-magnetic layers 61, 62, 63, 64 and 65 are provided at the respective portions to coat the respective portions with the respective non-magnetic layers 61 to 65.

Instead of synthetic resin material, the non-magnetic layers 61 to 65 may be of non-magnetic material such as synthetic rubber, aluminum or ceramics. Moreover, instead of coating, the non-magnetic layers 61 to 65 may be formed by attaching a thin film sheet or film with mounting means or the like.

It is possible to prevent magnetic dust such as iron powder from entering the magnetic circuit since the outer portion of the permanent magnet 39 fitted around the peripheral portion of the second rotor 33b is thus coated with the non-magnetic layer 61, the rotary magnetic rings 40 and 40 are coated with synthetic resin material for molding and with the non-magnetic layers 62 and 63 and the static magnetic rings 20 and 20 are coated with the case 5 made of synthetic resin and with the non-magnetic layers 64 and 65, whereby the entire magnetic circuit is coated with non-magnetic material. Accordingly, it is possible to prevent a short circuit of the magnetic circuit due to magnetic dust and to prevent false detection. Further, it is possible to simplify dust entering management to be performed until a torque detecting apparatus is assembled and to reduce the management cost. Moreover, even when run-out occurs at the first and second rotors 33a and 33b, it is possible to prevent the permanent magnet 39 and the rotary magnetic rings 40 and 40 from coming in direct contact with each other and to prevent a short circuit of the magnetic circuit due to run-out.

Figure 15:
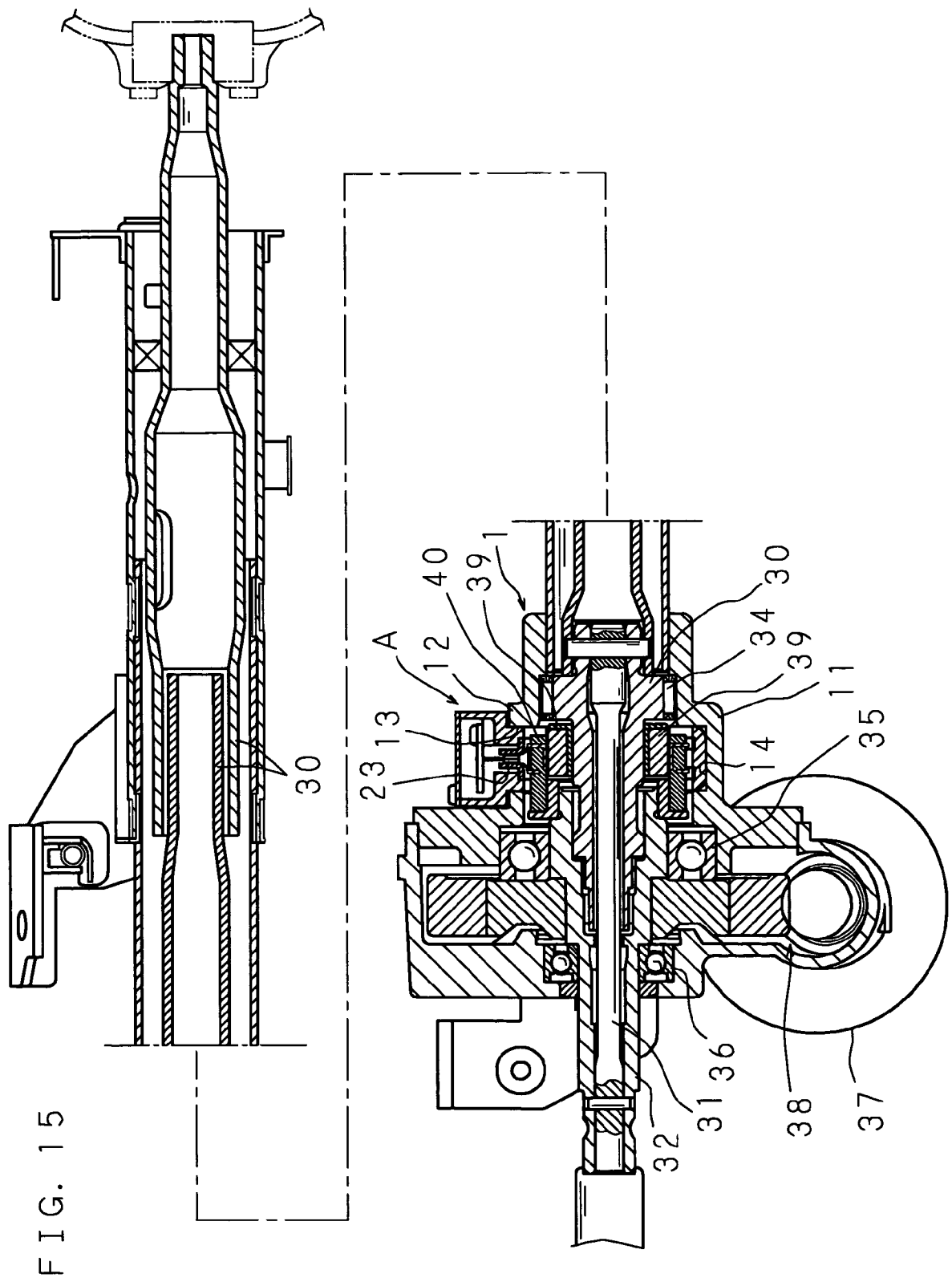
FIG. 15 is an enlarged sectional view showing an example of the torque detecting apparatus according to Embodiment 2 of the present invention used in an electric power steering apparatus.

FIG. 15 is an enlarged sectional view showing an example of the torque detecting apparatus according to Embodiment 2 of the present invention used in an electric power steering apparatus. The torque detecting apparatus A manufactured as described above is used in, for example, an electric power steering apparatus for a vehicle. This electric power steering apparatus comprises: an input shaft 30 (first rotor 33a) linked with a steering wheel and an output shaft 32 (second rotor 33b) connected coaxially with the input shaft 30 by a torsion bar 31; a housing 1 which surrounds the input shaft 30 and the output shaft 32 and supports the input shaft 30 and the output shaft 32 with three bearings 34, 35 and 36 so as to be freely rotatable; an electric motor 37 for steering assist which is mounted on the housing 1; a reduction mechanism 38 for transmitting the turning force of the drive shaft of the electric motor 37 to the output shaft 32; the torque detecting apparatus A; and a control unit (not illustrated in the figure) composed of the detection circuit board 4 of the torque detecting apparatus A and a microprocessor to be connected with the drive circuit of the electric motor 37. When the steering wheel is steered, the magnetism sensitive element 23 detects a rotational torque applied to the input shaft 30 on the basis of a torsion which arises at the torsion bar 31, the detection torque is converted into a voltage signal by the detection circuit board 4 and then given to the control unit, and the electric motor 37 is driven in a controlled manner with an indication signal outputted from the control unit, so that the output shaft 32 is rotated via the reduction mechanism 38.

The housing 1 has: a cylinder portion 11 surrounding the input shaft 30 and the output shaft 32; a mount 12, which is projected from one position of the peripheral portion of the cylinder portion 11, for mounting the case 5; a retainer 13, which has an opening at the mount 12 in the radial direction, for arranging the static magnetic rings 20 and 20 in the cylinder portion 11; and a fitting groove 14 curved corresponding to the annular portion 51 of the case 5. The case 5 is mounted on the mount 12.

Regarding this case 5, the static magnetic rings 20 and 20 are located in the cylinder portion 11 by inserting the annular portion 51 into the retainer 13 having an opening in the radial direction of the housing 1 and engaging the annular portion 51 with the fitting groove 14, and the rectangular cylinder portion 53 of the case 5 is mounted on the mount 12. After mounting this case 5, the input shaft 30 and the output shaft 32 are inserted into the cylinder portion 11 from the axial direction of the housing 1 and the permanent magnet 39 and the rotary magnetic rings 40 and 40 are arranged inside the static magnetic rings 20 and 20.

It should be noted that, though the outer portion (peripheral portion) of the permanent magnet 39, the inner surface portion of the rotary magnetic rings 40 and 40, the peripheral portion of the rotary magnetic rings 40 and 40, the inner surface portion of the static magnetic rings 20 and 20 and the inner side (magnetism sensitive element side) of the magnetism collecting projections 21 and 21 of the static magnetic rings 20 and 20 are coated with the non-magnetic layers 61 to 65 in the embodiment explained above, the present invention may have the following structures.

(1) The outer portion of the permanent magnet 39 and the inner side of the magnetism collecting projections 21 and 21 are coated with non-magnetic layers 61 and 65.

(2) The outer portion of the permanent magnet 39 is coated with a non-magnetic layer 61, or the inner side of the magnetism collecting projections 21 and 21 is coated with a non-magnetic layer 65.

(3) The outer portion of the permanent magnet 39 and the inner side of the magnetism collecting projections 21 and 21 are coated with non-magnetic layers 61 and 65 and, further, at least one of the inner surface portion of the rotary magnetic rings 40 and 40, the peripheral portion of the rotary magnetic rings 40 and 40 and the inner surface portion of the static magnetic rings 20 and 20 is coated with a non-magnetic layer 62, 63 or 64.

(4) The outer portion of the permanent magnet 39 or the inner side of the magnetism collecting projections 21 and 21 is coated with a non-magnetic layer 61 or 65 and, further, at least one of the inner surface portion of the rotary magnetic rings 40 and 40, the peripheral portion of the rotary magnetic rings 40 and 40 and the inner surface portion of the static magnetic rings 20 and 20 is coated with a non-magnetic layer 62, 63 or 64.

It should be noted that, instead of use in an electric power steering apparatus, the torque detecting apparatus A according to the present invention may be used in an apparatus other than an electric power steering apparatus.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A torque detecting apparatus comprising:
    a detecting unit for detecting a torque applied to a rotor according to rotation of the rotor;
    a detection circuit board which is electrically connected with the detecting unit via a conductor which is loosened;
    an annular portion having a through bore corresponding to the detecting unit; and
    a rectangular cylinder portion extending from a peripheral portion of the annular portion in the radial direction, and having a holder, wherein
    the detecting unit is retained in the annular portion, and the detection circuit board is mounted in the holder; and
    the detecting unit and the detection circuit board are integrated by a mold member made of synthetic resin; and
    further comprising a housing which has a cylinder portion to surround the rotor and a retainer for retaining the mold member to be fitted in a radial direction through an opening formed at a peripheral wall of the cylinder portion;
    wherein an outer end portion of the retainer and the mold member have locating faces for locating the detecting unit in the cylinder portion.

2. The torque detecting apparatus according to claim 1, further comprising a sealing member for sealing a clearance between a locating face of the retainer and a locating face of the mold member.

3. The torque detecting apparatus according to claim 1, wherein the detecting unit has two static magnetic rings having magnetism collecting projections projected from one portion thereof in a radial direction and a magnetism sensitive element arranged between the magnetism collecting projections.

4. A manufacturing method of a torque detecting apparatus, comprising the steps of:
    arranging a magnetism sensitive element connected with one end of a conductor between two static magnetic rings which are arranged apart from each other and molding a portion of each static magnetic ring and the magnetism sensitive element with synthetic resin material;
    connecting the other end of the conductor with a detection circuit board; and
    further molding the static magnetic rings, the detention circuit board and the conductor with synthetic resin material to form a mold member.

5. The manufacturing method of a torque detecting apparatus according to claim 4, wherein the conductor is loosened while connecting the other end of the conductor with the detection circuit board.

* * * * *